United States Patent
Bey et al.

(10) Patent No.: US 8,341,849 B2
(45) Date of Patent: Jan. 1, 2013

(54) METHOD FOR OPERATING A DISPLAY DEVICE DRIVEN BY AT LEAST ONE STEPPING MOTOR

(75) Inventors: Ulf Bey, Grossharrie (DE); Wolfgang Skerka, Rendsburg (DE)

(73) Assignee: Raytheon Anschuetz GmbH, Kiel (DE)

( * ) Notice: Subject to any disclaimer, the term of this patent is extended or adjusted under 35 U.S.C. 154(b) by 240 days.

(21) Appl. No.: 12/809,202

(22) PCT Filed: Jun. 4, 2009

(86) PCT No.: PCT/DE2009/000780
§ 371 (c)(1),
(2), (4) Date: Sep. 30, 2010

(87) PCT Pub. No.: WO2009/152796
PCT Pub. Date: Dec. 23, 2009

(65) Prior Publication Data
US 2011/0119939 A1    May 26, 2011

(30) Foreign Application Priority Data
Jun. 19, 2008  (DE) .......................... 10 2008 028 803

(51) Int. Cl.
*G01C 17/00*  (2006.01)
(52) U.S. Cl. ......................... 33/301; 318/696
(58) Field of Classification Search .................... 33/301, 33/300; 318/696, 685
See application file for complete search history.

(56) References Cited

U.S. PATENT DOCUMENTS

| | | | | |
|---|---|---|---|---|
| 4,140,075 | A | * | 2/1979 | Berkhan ................ 114/150 |
| 4,314,146 | A | * | 2/1982 | Berney ................. 377/112 |
| 5,285,380 | A | * | 2/1994 | Payton ................. 701/301 |
| 5,640,075 | A | | 6/1997 | Brasseur |
| 5,770,937 | A | | 6/1998 | Tsuda |
| 5,844,393 | A | | 12/1998 | Vu |
| 6,311,634 | B1 | * | 11/2001 | Ford et al. ............. 114/144 R |
| 6,549,831 | B2 | * | 4/2003 | Thompson ............ 701/21 |
| 8,194,222 | B2 | * | 6/2012 | Seki et al. ............. 349/149 |
| 2002/0099480 | A1 | * | 7/2002 | Thompson ............ 701/21 |
| 2011/0119939 | A1 | * | 5/2011 | Bey et al. .............. 33/301 |

FOREIGN PATENT DOCUMENTS

| | | |
|---|---|---|
| DE | 19821835 | 11/1999 |
| EP | 0571759 | 12/1993 |
| EP | 0666643 | 8/1995 |
| GB | 2239526 | 7/1991 |
| GB | 2292026 | 2/1996 |

\* cited by examiner

*Primary Examiner* — Yaritza Guadalupe-McCall
(74) *Attorney, Agent, or Firm* — The Livingston Firm; Edward M. Livingston, Esq.; Bryan L. Loeffler, Esq.

(57) ABSTRACT

Method for operating a display device driven by at least one stepping motor with display scales, having the following steps: determining suitable step widths at least in ranges affected by stroboscopic flicker effects when driving in each case one stepping motor for moving the display scale in a measuring run when starting the instrument or on request, storing the determined step widths in the form of a matching parameter, and operating the stepping motor(s) with a suitable step-width resolution in the ranges that are identified as affected by the stroboscopic flicker effects to be avoided.

7 Claims, 1 Drawing Sheet

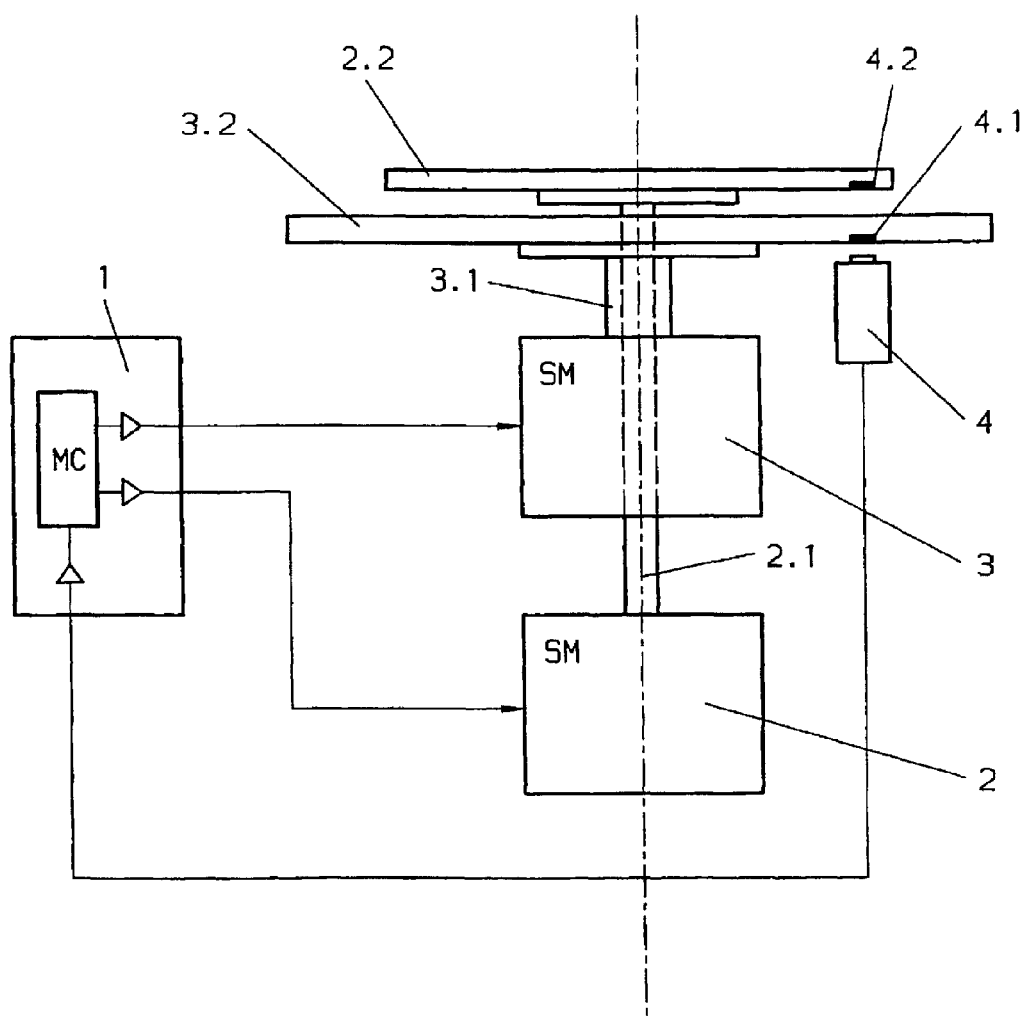

METHOD FOR OPERATING A DISPLAY DEVICE DRIVEN BY AT LEAST ONE STEPPING MOTOR

The invention relates to a method for operating a display device driven by at least one stepping motor with display scales according to the preamble of the Main Claim, in particular a rudder position or direction indicator of a ship.

Such directly driven display devices that in addition often also exhibit a second compass rose used for fine reading with a finer division are used for example on steering bridges of ships.

Problems are created with the display of a display device driven by at least stepping motor with display scales in particular in the case of fast rotations that in particular for fast ships that can carry out changes in the direction of rotation within a few seconds can lead to stroboscopic effects occurring that again cause the scaling to blur for the person reading the instrument and unambiguous detection of the course not to be possible.

However precisely in the case of fast rotations it is desired to detect the course very accurately before reaching the new course so as to be able to counter steer a bit in time and to have "intercepted" the ship in its rotation for the new course. Previous display devices are too strongly designed with a view to ships traveling slowly.

Furthermore exists the problem exists that due to step losses in the case of stepping-motor resonances incorrect course displays can be produced that are of course to be avoided in any case.

More complex requirements further result from two compass roses being usually combined, one being finely divided, the other being coarsely divided.

According to the invention a method is now specified for operating a display device driven by at least one stepping motor, in which the step widths affected by flicker effects are left out and the stepping motors are in each case driven in problem-free step-width ranges identified as without flicker effects. These ranges are newly measured when starting the instrument or on request so as to take into account changes in temperature and manufacturing tolerances (hot summer day to cold frost night) that can shift the resonance quite considerably.

Advantageously two disks (roses) are driven by two stepping motors. The drive takes place directly, without any intermediate gearbox. The fine rose is embedded mechanically into the coarse rose to enable coarse/fine representation.

Here each rose is connected directly to the stepping motor, the stepping motors being mounted such that the fine-rose shaft passes through the hollow shaft of the coarse rose or the coarse-rose shaft through the hollow shaft of the fine rose.

Since the aim is not to let any stroboscopic effects appear by the roses during the course of their moving when displaying the angular values since else the scaling becomes blurred and unambiguous detection of the course is not possible, operation of the roses is now permitted only with those step widths—e.g. a step that is six times large than the finest resolution permits—that does not cause any resonances. Also step losses are to be avoided that so far were frequently the result of stepping-motor resonances and over time lead to deviations from the desired display value that of course are to be avoided because an incorrect display of the course can lead to incorrect courses of the ship—at any rate at short notice—which can have serious consequences.

To determine a suitable compensation, driving sequences that are a function of the rotary movement are suggested that are established during the initial positioning of the two roses "Fine" and "Coarse".

The suggested method for driving a stepping motor for a display device directly driven by at least one stepping motor with rotating display scales, a measurement run is first carried out to determine the problematic ranges of the stepping motors operated with different step widths, in that a stepping motor having a defined pre-determined step width is driven and a measuring point provided at the display rose is detected by a sensor next to the display rose with its sensor response, the display rose with varying step widths is moved past the sensor, the sensor response of the measuring point always being determined in the process and a desired value/actual value comparison being carried out, to determine the step widths where there is resonance and/or steps are omitted.

The following operation of the stepping motor(s) using the suitable step widths determined like this or in a similar way at least in problematic ranges affected by error possibilities when driving in each case one stepping motor for moving the display scale that are present in a table in the form of a matching parameter, and operating the stepping motor(s) with a suitable step-width resolution in the ranges that are identified as affected by flicker or error, ensures that there always exists a correct 1:1 relation between display and the physical quantity that is to be displayed.

The measuring run in addition always also again provides absolute statements on the position of the compass roses of the display scales, apart from the actual determination of the critical ranges.

The main advantage however is that simple stepping motors can be used that according to their type of construction have an improved efficiency, in particular produce less waste heat. Thus a 5 phase motor that is more expensive by orders of magnitude can be replaced by a 2 phase motor. Expensive gearboxes can be omitted and an accurate, always unadulterated display is obtained with a clearly recognizable display even for a high resolution.

In the measuring run carried out to determine the problematic stepping-width ranges of the stepping motors operated with different frequencies, in each case one of the stepping motors is driven with a defined pre-determined step width from a spectrum possible during operation and a measuring point provided at the display rose is detected optically or inductively by a sensor next to the display rose. Other detection possibilities are not ruled out.

The display rose is thus moved past the sensor for some time with varying step widths and the preferably electric sensor response of the measuring point produced in the process is detected and logged in table form, whereupon the results of a desired value/actual value comparison in the table serve to mark the step widths where resonance exists and/or steps are omitted. They are then occupied by a matching factor, the correction to achieve a wider step width not getting lost, but taking place at a later time for example as a large step.

Further advantages and features are apparent from the following description of a preferred exemplary embodiment using the appended drawing, in which:

the sole FIGURE shows a schematic sectional illustration of the apparatus with the two display roses for coarse and fine display, that lie on top of each other.

In the right area a sensor for a measuring point arranged on the disks is shown.

The inventive procedure for operating a display device driven by at least one stepping motor with display scales thus consists of the following steps: determining suitable step widths at least in problematic ranges affected by error possibilities when driving in each case one stepping motor for moving the display scale in a measuring run when starting the instrument or on request, storing the step widths determined in the form of a matching parameter, and operating the stepping motor(s) with a suitable step-width resolution in the ranges that are identified as affected by flicker and thus with error possibilities.

To determine the problematic ranges, during the measuring run a stepping motor is driven with a defined pre-determined step width and a measuring point provided at the display rose is detected by a sensor next to the display rose with its sensor response, then the display rose is moved past the sensor with varying frequencies and the sensor response of the measuring point is detected in the process so that a desired value/actual value comparison will take place, to determine the frequencies where there is resonance and/or steps are omitted. They are left out after the measuring run.

In the process preferably a metal platelet at the display rose is tapped inductively with detection of the respective actual step widths.

FIG. 1 shows the resonance and step compensated direct drive of the stepping motor system consisting of two stepping motors (2, 3) with roses on the shafts (2.2, 3.2, 3.3, 2.1), a drive electronics (1) with MC and stepping-motor drivers and an optical or inductive sensor (4, 4.1, 4.2).

The MC (1) drives the stepping motors in a fine-step resolution (2, 3) via the stepping-motor drivers. The optical/inductive sensor (4, 4.1, 4.2) serves two purposes in the process:
  to measure the stepping-motor parameters (resonance and step quality) and
  to sample the initial position.

To measure the stepping-motor parameters (resonance—and step quality), soon after applying the operating voltage the MC will drive the coarse rose (3.2) to the sensor position (4, 4.1), the step size of the sensor coverage being measured (4, 4.1).

This measurement is required prior to each parameter determination since the sensor scanning tolerance (4) strongly depends on the temperature. The MC (1) now moves alternatingly over the sensor (4, 4.1) from left and right and traverses a frequency and step ramp during the driving operation. The MC constantly measures the reflection of the sensor (4, 4.1) and compares it with the impressed drive values of the stepping motor (3).

The values determined are placed in a sine/cosine step table and serve as up-to-date drive parameters for the operation of the coarse-stepping motor (3).

Said method is also used for determining parameters of the fine-stepping motor (2) that is then also driven by a sine/cosine step table established only for this stepping motor (2).

This method should be executed after each switching on of the system for compensation purposes.

Sampling the initial position takes place after determining the parameters of the individual stepping motors (2, 3), the roses approaching the zero points of the degree-representation to then be driven to the up-to-date course value by the MC (1).

After the start or on request the instrument goes through a coarse-fine rose alignment to 0°. The base for this driving operation is a sine-weighted stepping motor-microstep table having a step resolution of 0.00703°. This corresponds to =51200 steps for 360°. In this phase the resonance ranges are determined for rotary movements of the compass roses up to 30°/sec and a step-correction table is calculated and already included in the drive operation.

The correction table is thus no bypassing of resonance frequencies by means of frequency suppression, but a step-width adaptation to the attributes of the stepping motors and the mechanical components.

The high microstep resolution plus correction permits step-width adaptation so as to avoid optically critically image sequences (representation of the coarse/fine roses) while maintaining the real-time representation of the rotary movement of the ship.

An example:
A) Driving operation without correction
old actual value in steps=12000=84.36° old step value+1 step=$X_1$, $X_1$+1 step=$X_2$, $X_2$+1 step=$X_3$, $X_3$+1 step=$X_4$, $X_4$+1 step=$X_5$, $X_5$+1 step=$X_6$, end value=84.402°
B) Driving operation with correction=6
old actual value in steps=12000=84.36° old step value+0 step=$X_0$, $X_1$+0 step=$X_0$, $X_2$+0 step=$X_0$, $X_3$+0 step=$X_0$, $X_4$+0 step=$X_0$, $X_5$+6 steps=$X_6$, end value=84.402°

Having thus described our invention, we claim:

1. Method for operating a display device driven by at least one stepping motor with display scales, characterized by
  determining suitable step widths at least in the ranges recognized as affected by stroboscopic flicker effects when driving in each case one stepping motor for moving the display scale in a measuring run when starting the instrument or on request,
  storing the step widths determined in the form of a matching parameter, and
  operating the stepping motor(s) with a suitable step-width resolution in the ranges that are identified as affected by the stroboscope flicker effects to be avoided.

2. Method according to claim 1, characterized in that to determine the ranges affected by stroboscopic flicker effects of the stepping motors operated using different step widths a measuring run is carried out, in that:
  a stepping motor with a defined pre-determined step width is driven and a measuring point provided at the display rose is detected by a sensor next to the display rose with its electric sensor response,
  the sensor rose with varying step widths is moved past the sensor, the sensor response of the measuring point always being determined in the process, and
  a desired value/actual value comparison takes place, to determine the step widths where there is resonance and/or steps are omitted.

3. Method according claim 2, characterized in that a metal platelet at the display rose is tapped inductively.

4. Method according to claim 2, characterized in that two compass roses form the display scales and the respective step widths of the stepping motors for the two compass roses are stored to the values that have been determined in table form.

5. Method according claim 1, characterized in that a metal platelet at the display rose is tapped inductively.

6. Method according to claim 5, characterized in that two compass roses form the display scales and the respective step widths of the stepping motors for the two compass roses are stored to the values that have been determined in table form.

7. Method according to claim 1, characterized in that two compass roses form the display scales and the respective step widths of the stepping motors for the two compass roses are stored to the values that have been determined in table form.

* * * * *